(12) United States Patent
Nair

(10) Patent No.: US 8,340,820 B2
(45) Date of Patent: Dec. 25, 2012

(54) ROBOT ARM AND METHOD OF CONTROLLING ROBOT ARM TO AVOID COLLISIONS

(75) Inventor: Prasad P. Nair, Oakland, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 323 days.

(21) Appl. No.: 12/713,232

(22) Filed: Feb. 26, 2010

(65) Prior Publication Data

US 2011/0213497 A1  Sep. 1, 2011

(51) Int. Cl.
*B25J 9/16* (2006.01)

(52) U.S. Cl. .................................... 700/255; 901/2

(58) Field of Classification Search .................. 700/255, 700/160, 184, 185, 252, 253; 901/2, 3, 42, 901/14, 43; 701/301; 318/567, 568.11–568.13, 318/568.21, 572–574, 568.1

See application file for complete search history.

(56) References Cited

U.S. PATENT DOCUMENTS

| 4,723,219 A * | 2/1988 | Beyer et al. ................... 700/190 |
| 4,912,383 A * | 3/1990 | Takeyama et al. ....... 318/568.11 |
| 7,774,099 B2 * | 8/2010 | Kobayashi et al. ........... 700/245 |

* cited by examiner

*Primary Examiner* — Dalena Tran

(57) ABSTRACT

A method of automatically controlling an extendable robot arm to avoid collisions while returning to a first position from a second position includes periodically storing locations of the robot arm as the robot arm moves along a forward path from the first position to the second position; applying heuristic algorithms to the stored locations to determine a return path to the first position, the return path including at least a portion of a retrace path retracing the stored locations of the forward path; and controlling the robot arm to return to the first position using the determined return path.

19 Claims, 13 Drawing Sheets

ROBOT ARM AND METHOD OF CONTROLLING ROBOT ARM TO AVOID COLLISIONS

BACKGROUND

Robots in laboratory settings may be incorporated into activities requiring precision operation within a work area or tool space. For example, a life sciences laboratory may include a robot having an extendable arm that moves payloads, such as plates or holders for laboratory samples, between instruments or stations. When such a robot is only able to extend radially from the center location, there is no danger of the robot colliding with obstacles, such as the instruments or stations, within the tool space, because each of the obstacles will have to be placed along a radial axis extending from the center location.

However, a robot having independent movement in various joints of an extendable arm, such as a wrist or elbow is able to move along non-radial paths. The independent movement increases the flexibility of the robot, and allows more instruments or stations to be placed throughout the tool space, at various locations without regard to whether they are located on a radial axis. The increased density and capability to move along arbitrary paths increases the chances of collisions between the robot and the various instruments and stations, as well as any other obstacles located with the tool space.

A robot having an extendable arm includes a "safe zone," which is a predetermined location or area in which the robot is in no danger of colliding with itself or any obstacles within a full 360 degree waist rotation. After any movement outside the safe zone, the robot is configured to return to the safe zone, which may be accomplished according to a number of conventional techniques, all of which undesirably expose the robot to the possibility of collisions. That is, in typical transfer moves, the robot knows to return to the safe zone using a predetermined path. For example, one conventional technique radially pulls in the robot arm from its extended location in the tool space back to the safe zone. The radial pull-in provides a fast and smooth movement, but it is blind to potential collisions. The responsibility therefore falls on the system operator or user to ensure that the robot does not collide with any of the obstacles in the tool space when the pull-in command is issued, e.g., by manual intervention.

Another conventional technique moves the robot back to the safe zone through a series of incremental jog commands. In particular, the user visually estimates safe increments for each movement. However, jogging the robot is tedious and time consuming, and collisions may still occur when the visual estimations of the incremental movements are not accurate. Also, when the robot is in a zone where movements are particularly restricted due to potential collisions, then the jog command approach becomes particularly difficult to implement.

Yet another conventional technique involves placing the robot being in "limp mode," which is typically used for manually guiding or training the robot through desired movements and recording the training movements for later use. When used for returning the robot to the safe zone, the limp mode enables the user to physically grasp the extendable arm of the robot at its location in the tool space and pull it towards the safe zone. However, manually guiding the robot around any obstacles to the safe zone is inefficient and labor intensive. Also, this technique may not be practical, for example, when the extendable arm is in a place in the tool space where it is not easily reachable by hand.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

According to various embodiments, a method is provided for enabling a processor controlled robot, such as direct drive robot (DDR), to return to a safe zone, automatically from anywhere within a tool space (e.g., working area) of the robot, while avoiding collisions with any obstacles, such as instruments or stations, situated in the tool space. As stated above, the safe zone is a predetermined location or area in which the robot is in no danger of colliding with itself or any obstacles within a full 360 degree waist rotation.

Figure 1:
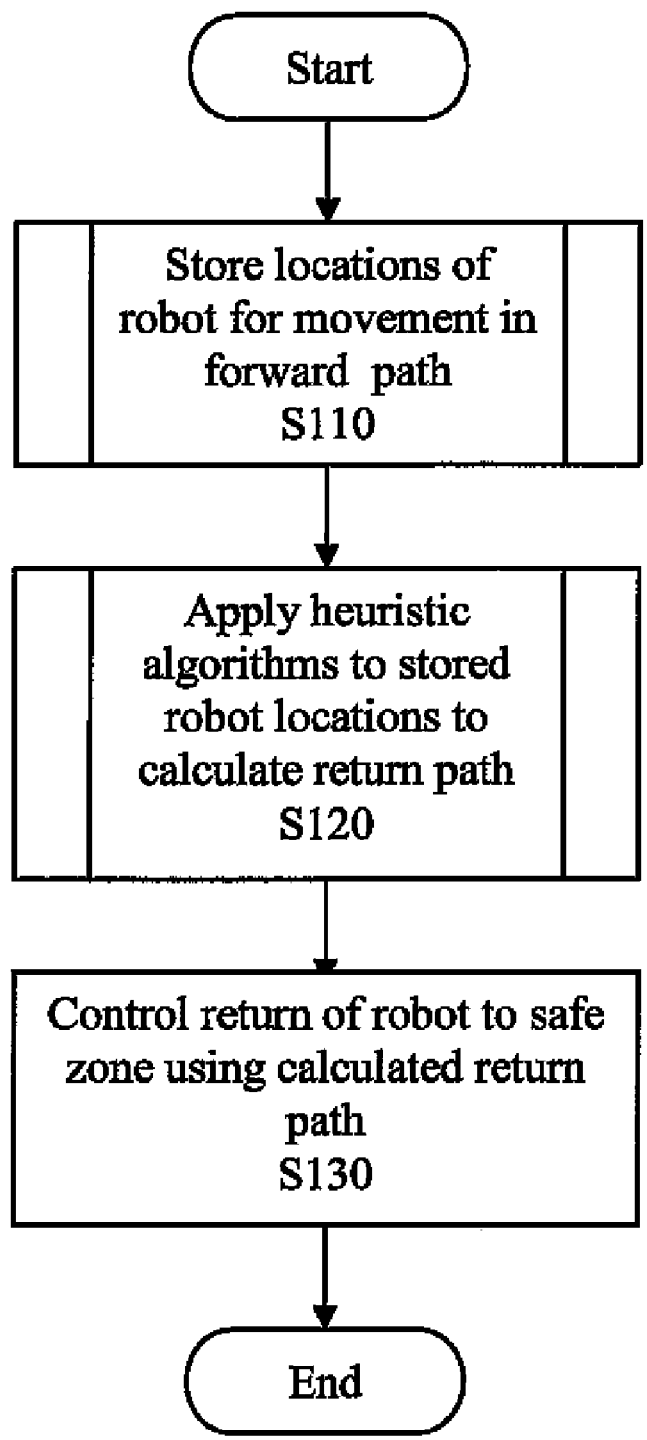
FIG. 1 is a flow diagram illustrating a process for controlling a robot to avoid collisions, according to a representative embodiment.

FIG. 1 is a flow diagram illustrating a method for moving a robot to a safe zone, according to a representative embodiment.

Referring to FIG. 1, block S110 indicates a process for storing locations of the robot as it moves from a first position, e.g., within the safe zone, to a second position, e.g., within the tool space outside the safe zone. The movement from the first position to the second position is referred to as a "forward path" of the robot, and the stored locations may correspond to points periodically identified along the forward path. The second position may correspond to a station or instrument, for example, at which the robot picks-up, delivers or otherwise manipulates a sample or other payload.

Block S120 indicates a process for applying one or more heuristic algorithms to all or some of the stored locations of the robot in order to calculate a path from the second position back to the first position, referred to as a "return path." In various embodiments, depending on the results of applying the heuristic algorithms, the return path may substantially correspond to all or a portion of the forward path. For example, the return path may retrace an ending portion of the forward path (e.g., closest to the second position), but then substantially depart from the forward path by including a blind radial pull-in of the robot to the first position, as discussed below with reference to FIG. 8. The portion of the forward path that is retraced (i.e., the inverse of the forward path), may be referred to as a "retrace path" or a "retrace portion" of the return path.

In block S130, the robot is controlled to return to the first position using the return path calculated in block S120. In various embodiments, the heuristic algorithms may be applied as the robot physically moves from point to point along the return path as they are determined. In various alternative embodiments, all or a portion of the return path may be calculated using the heuristic algorithms before the robot makes any movement from the second position. The heuristic algorithms provide techniques for preventing collisions between the robot and obstacles in the tool space as the robot returns to the first position along the return path. For example, the heuristic algorithms may include performing a gridding operation, generating waypoints, selectively performing a blind radial pull-in operation and/or performing various collision avoidance techniques, as discussed below.

According to various embodiments, the robot safely moves back to the first position (e.g., the safe zone) automatically, with no manual intervention, no matter where the robot is in the tool space and what obstacles may be surrounding it, thus saving time and effort by the user and avoiding collisions. Further, the robot is able to safely move back to the first position regardless of how the robot got to its current location at the second position, e.g., via transfer moves, jogging, dragging in the limp mode, or the like.

Figure 2:
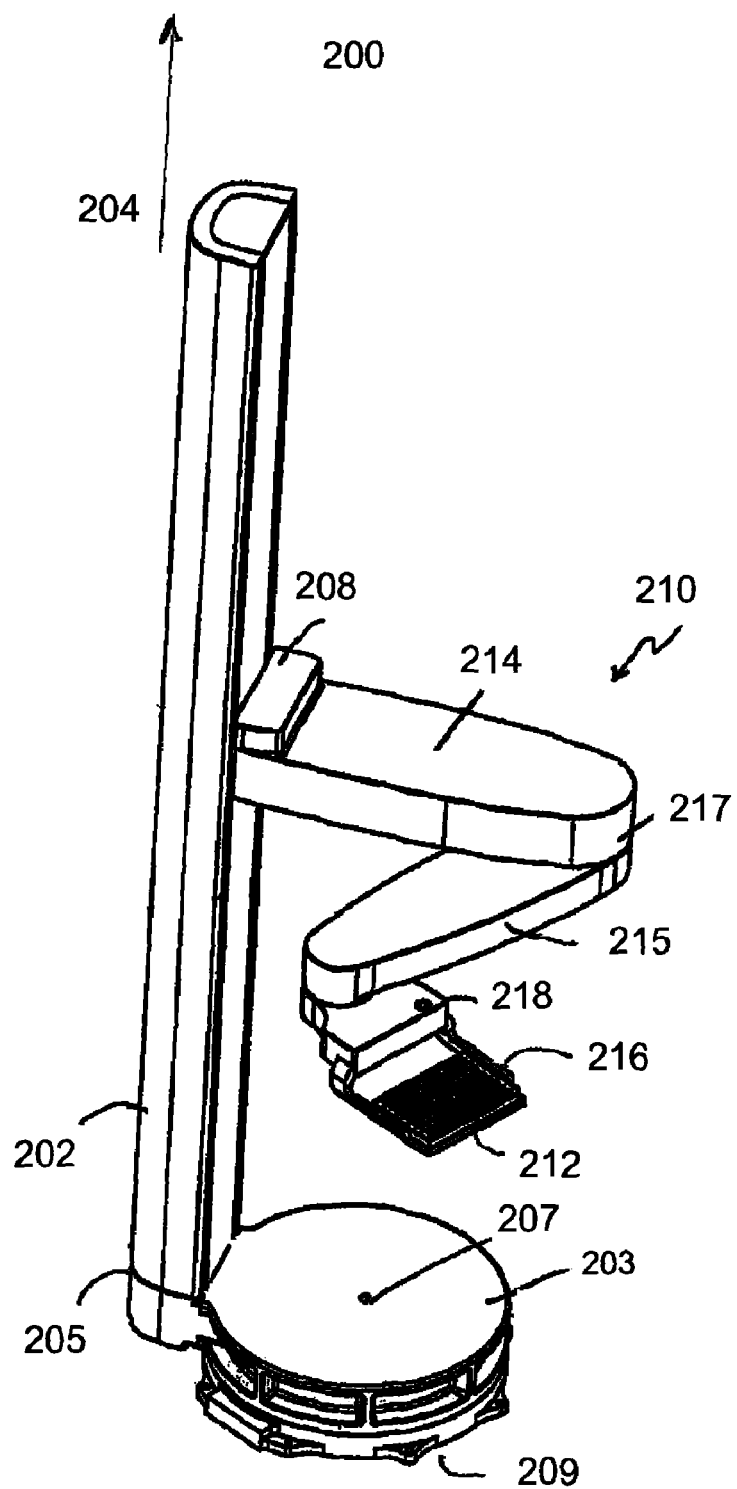
FIG. 2 is a perspective view illustrating a robot having an extendable arm, according to a representative embodiment.

FIG. 2 is a perspective view of a robot having movable members configured to return to a safe zone, according to a representative embodiment.

Referring to FIG. 2, robot 200 includes extendable arm 210 connected to waist 202. The extendable arm 210 includes multiple members that enable movement in three dimensions throughout a tool space of the robot 200. The robot 200 may be implemented alone or incorporated within a system, such as a BioCel System, available from Agilent Technologies, Inc., for example. In addition, the robot 200 may include direct drive technology, which reduces the number of moving parts, improves operational precision and eliminates gears, for example.

In the depicted embodiment, the extendable arm 210 includes a first member or upper arm 214, a second member or forearm 215, a wrist 218 and a gripper 216. A proximal end of the upper arm 214 is slidably coupled to the waist 202, enabling movement of the upper arm 214, and thus the extendable arm 210, along a longitudinal axis 204 of the waist 202. In the example shown, the upper arm 214 is movable along the waist 202 through attachment to a movable stage 208, which moves the upper arm 214 along the axis 204 of the waist 202.

The forearm 215 is attached below the upper arm 214, such that a distal end of the forearm 215 may pass below the upper arm 214 (near the proximal end of the upper arm 214) and extend beyond the distal end of the upper arm 214 at various angles. More particularly, a proximal end of the forearm 215 is connected to the distal end of the upper arm 214 by a rotational joint or elbow 217. Accordingly, the forearm 215 is movable through angles of at least 360 degrees around the elbow 217. Thus, the extendable arm 210 is movable, for example, such that the distal end of the forearm 215 passes under the proximal end of the upper arm 214 as the distal end of the forearm 215 is moved from one side of the waist 202 to another side of waist 202. The range of movement of the extendable arm 210 defines the tool space of the robot 200.

In an embodiment, the extendable arm 210 also includes an effector, such as gripper 216, which may take action upon an item manipulated by robot 200. FIG. 2 shows a payload 212 as an example of an item manipulated by robot 200. The payload 212 may be a holder or plate for a laboratory sample, such as a microtiter plate, an SBS microplate or the like, for example. The gripper 216 is coupled to the distal end of the forearm 215 by a rotatable joint or wrist 218, although other ways of mounting the gripper 216 may be included without departing from the scope of present teachings. When the extendable arm 210 moves the payload 212 from a first location to a second location, the gripper 216 and/or the payload 212 may be moved past the proximal end of the upper arm 214, e.g., whenever this path is shorter than moving the gripper 216 and/or the payload 212 in front of the upper arm 214. Thus, the extendable arm 210 may be moved in a way that takes payload 212 via a path shorter than the path that the payload 212 would otherwise have been if payload 212 were moved in front of the distal end of the upper arm 214.

The robot 200 further includes a base 203, which has a mounting portion 213 and a coupling portion 223. The mounting portion 213 is configured to mount the robot 200 in a larger robotic system, on a table, on the floor or on another object or system. The bottom end of the waist 202 is coupled to a coupling portion 205, which is rotatable relative to the mounting portion 209 about an axis that extends parallel to the longitudinal axis of the waist 202 through the center 207 of the base 203. The waist 202 may be coupled to the coupling portion 205 at a location offset from the center 207 of the base 203, such that the waist 202 is not located on top of the base 203.

Figure 11:
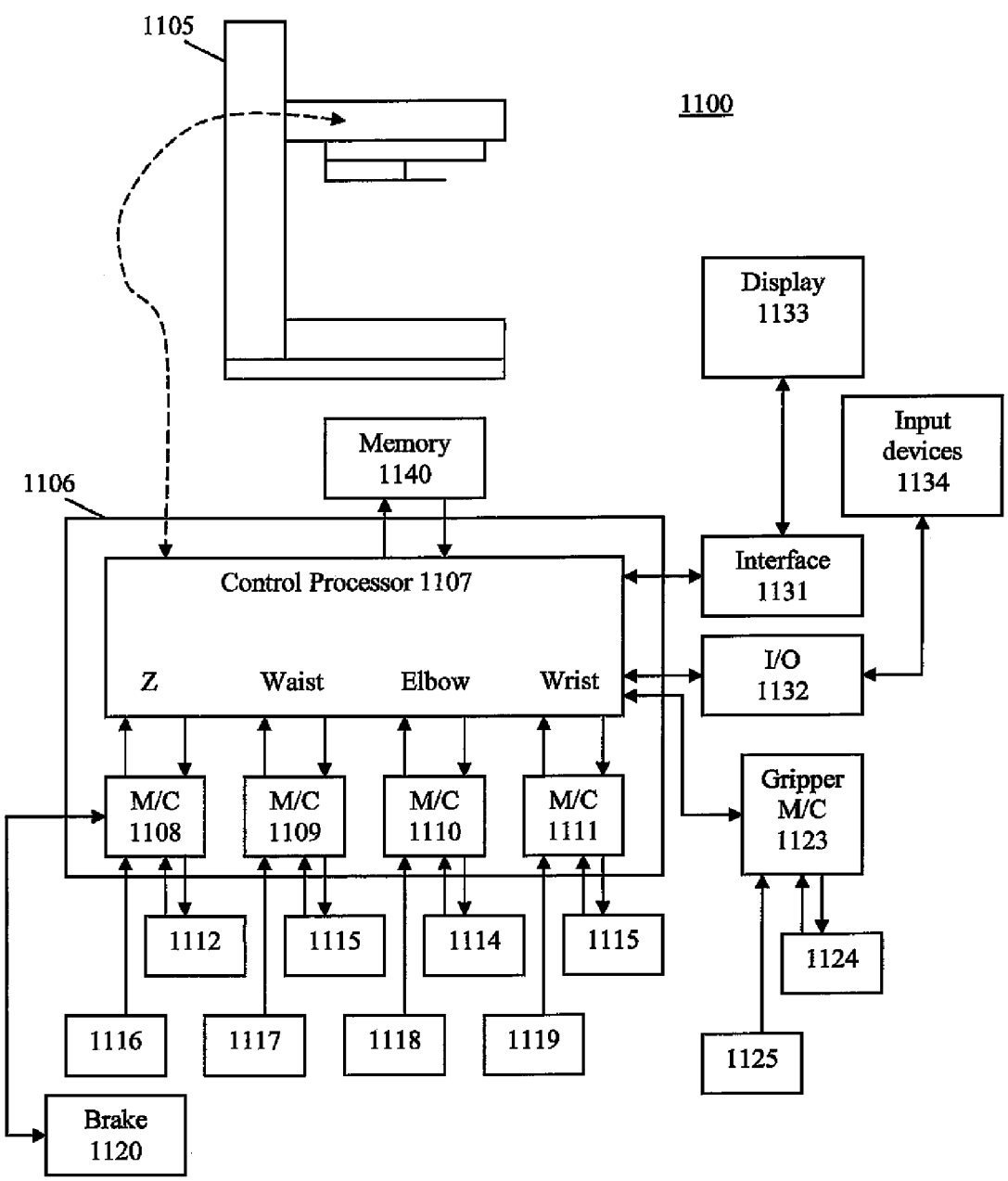
FIG. 11 is a block diagram of a robotic system, according to a representative embodiment.

The robot 200 additionally includes various robotic controls and drivers. For example, the elbow 217 between the upper arm 214 and the forearm 215 may incorporate a direct-drive motor. Similarly, a direct-drive motor may be incorporated to rotate the wrist 218 relative to the forearm 215, and the gripper 216 may incorporate one or more direct-drive motors. The base 203 may additionally incorporate a direct-drive motor to rotate the coupling portion 205 relative to the mounting portion 209. Motors or drive systems other than direct-drive motors may be used without departing from the scope of the present teachings. A representative embodiment of robotic controls and drivers are depicted in FIG. 11.

Figure 3A:
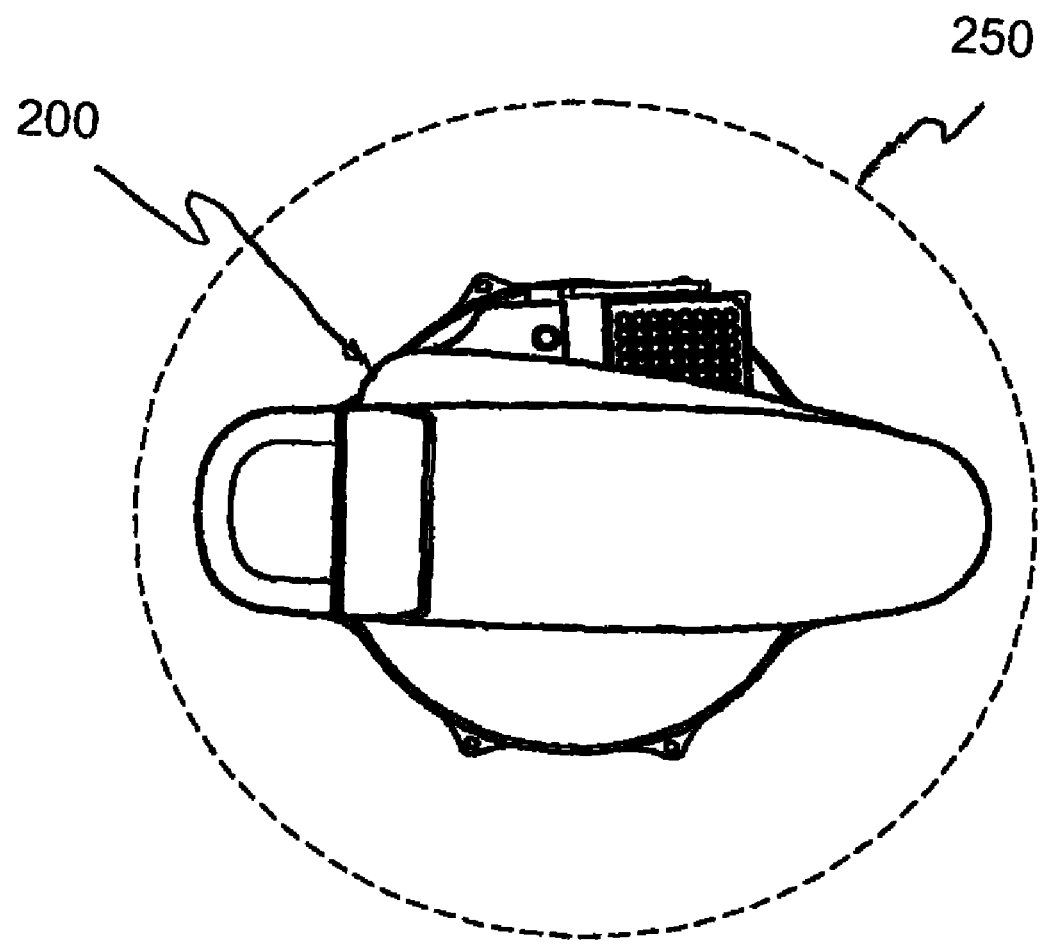
FIGS. 3A-3C are perspective views illustrating a robot having an extendable arm in various positions, according to a representative embodiment.
Figure 3B:
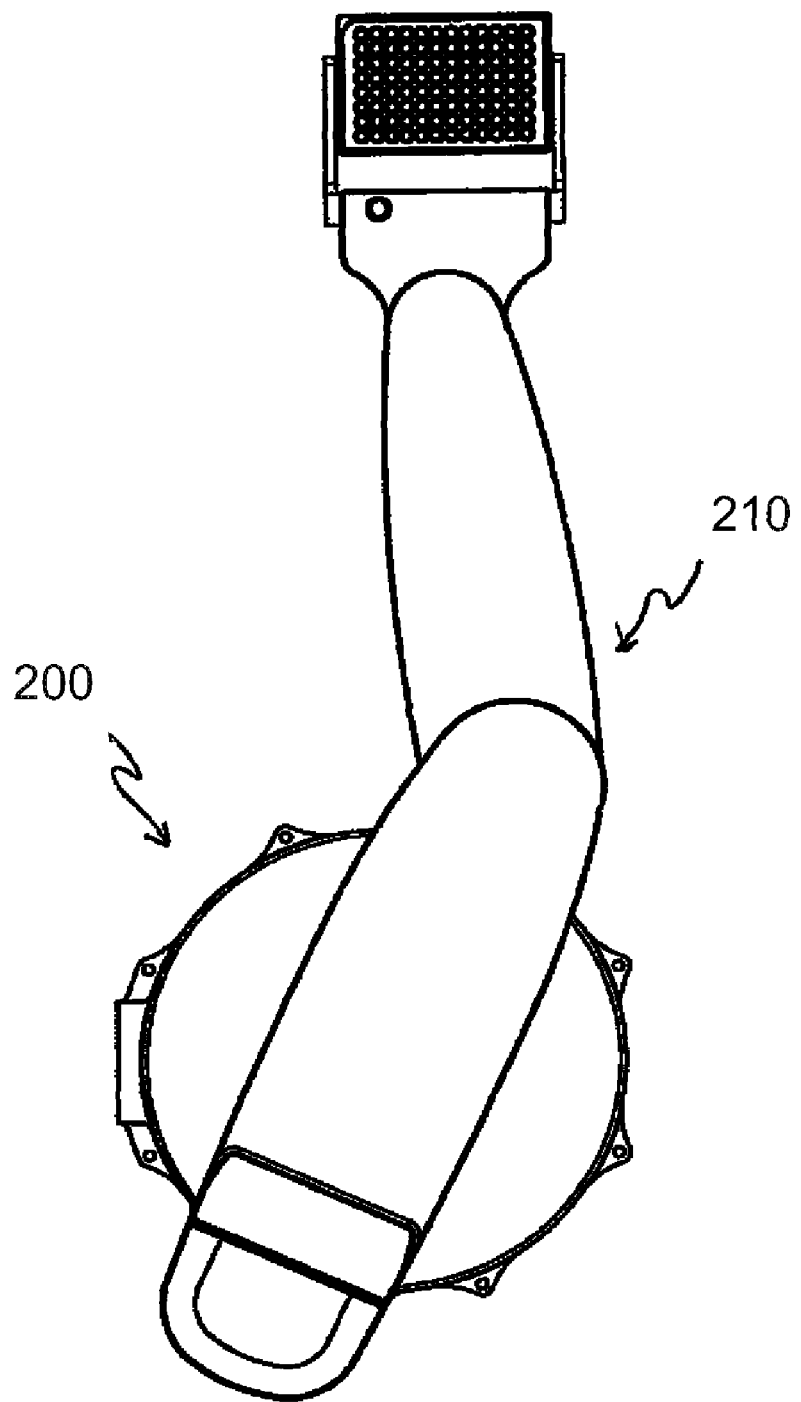
Figure 3C:
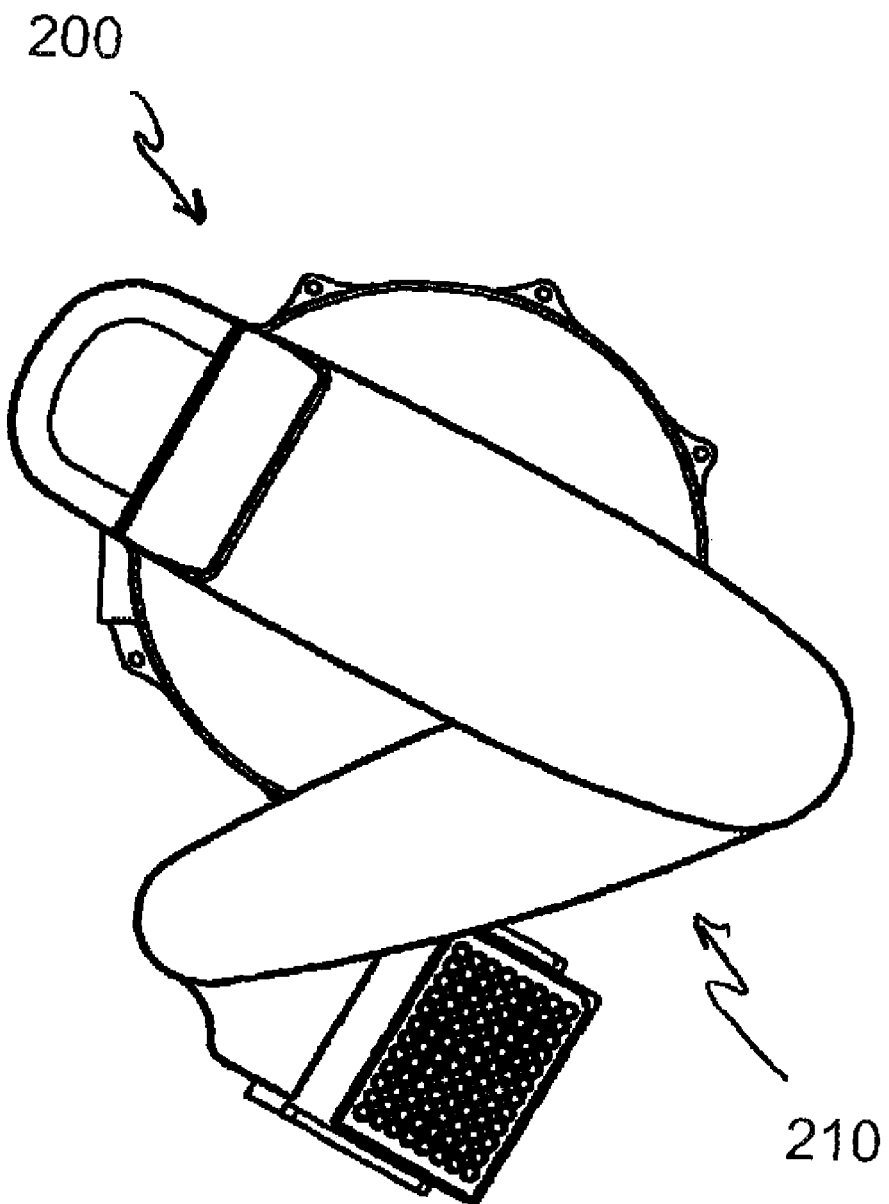

FIGS. 3A-3C are top perspective views showing the robot 200 with the extendable arm 210 in different operational positions, as the robot arm moves the payload 212.

In particular, FIG. 3A depicts the extendable arm 210 in a retracted position, in which the extendable arm 210 is fully retracted within the safe zone 250. As stated above, the safe zone 250 is a predetermined location or area in which the robot 200 is in no danger of colliding with itself or any obstacles within a 360 degree rotation of waist 202. According to an embodiment, the safe zone 250 is formed in the range of movement of upper arm 214 and is in a circumference of a circle formed by the outer edge of rotation of upper arm 214. Also, in an embodiment, the safe zone 250 is a cylinder having minimum and maximum heights defined by z-axis soft limits, and a radius of about 250 cm, for example. The center of the safe zone 250 substantially coincides to the center 217 of the base 203, about which the robot 200 rotates, and has a center axis aligned with the center axis 204 of the waist 202. Alternatively, the safe zone may be defined as the boundary within which the robot is allowed to move without colliding with external devices. Of course, configurations of the robot 200 and the safe zone 250 may vary, without departing from the scope of the present teachings.

FIGS. 3B and 3C depict the extendable arm 210 in (partially) extended positions in different portions of the tool space, in which the extendable arm 210 is outside the safe zone 250.

Referring to FIGS. 2 and 3A-3C, an illustrative transfer of the payload 212 (e.g., a plate transfer) begins with the robot 200 in a retracted position within the safe zone 250, shown in FIG. 3A. The extendable arm 210 of the robot 200 may move to a first extended position, shown in FIG. 3B, and pick up a plate, for example, at a first station (not shown). The robot 200 then retracts to the safe zone 250. The extendable arm 210 of the robot 200 may then move to a second extended position, shown in FIG. 3C, and place the plate at a second station (not shown), for example. The robot 200 again retracts to the safe zone 250. The first and second stations therefore coincide with respective "teachpoints," although teachpoints may coincide with positions or instruments other than stations within the tool space.

Each of the illustrative transfer moves is predetermined in that they have been previously learned by the robot 200. For example, the user may teach the transfer moves by moving the robot 200 along desired paths to the first and second teachpoints while the robot 200 is in the limp mode. More particularly, the user may first teach the robot 200 the location of the first teachpoint, and specify the "clear height" or "clear location," which is above the teachpoint (e.g., in the vertical direction). The retract distance to the safe zone 250 from the first teachpoint is determined based on the associated clear height from which the robot 200 may perform a blind radial pull-in. The robot 200 records the intermediate points (referred to as "waypoints") in association with the first teachpoint for later use, by storing locations and/or positions corresponding to the movement in memory (e.g., memory 1140 in FIG. 11, discussed below). Therefore, when the user requests the robot 200 to make a particular transfer, the robot 200 knows the path to travel between the first and second stations or teachpoints, avoiding obstacles within the tool space.

However, when the robot 200 stops outside the safe zone 250, there is no predetermined movement for the robot 200 to follow in order to avoid collisions. There are a number of reasons that the robot 200 may stop outside the safe zone 250. For example, under open loop control, the robot 200 is in the limp mode (where the robot 200 is in open loop with gravity compensation for the z-axis), and the user may physically maneuver extendable arm 210 through the tool space. Such movements are typically performed when the user is teaching the robot the various teachpoints that will be used in automated transfer protocols, as discussed above.

Under closed loop control, the robot 200 may be moved in a variety of ways. For example, the robot 200 may move objects (e.g., plates) between various stations, such as the first and second stations discussed above with reference to FIGS. 3A-3C, according to the user specified protocol. During these motions, the robot 200 may stop in mid-motion for a number of reasons, including violation of position following error bounds, motor current exceeding rated capacity of an amplifier, interruption of power, or collision with a station or obstacle in the tool space, for example. Before the protocol movements can be restarted, the robot 200 must be returned to the safe zone 250. Also, robot 200 may be jogged out of the safe zone 250. That is, incremental or absolute position movement commands may be made to individual joints of the extendable arm 210 (units: degrees for joints and mm for z-axis), or to XYZ Cartesian moves in the tool space. Again, the robot 200 must be returned to the safe zone 250. Regardless of the reason for the robot 200 being out of the safe zone 250, the paths already known to the robot 200 may be irrelevant because the starting position of the robot 200 could be anywhere within the tool space, so use of or return to known paths may result in collisions.

Figure 4:
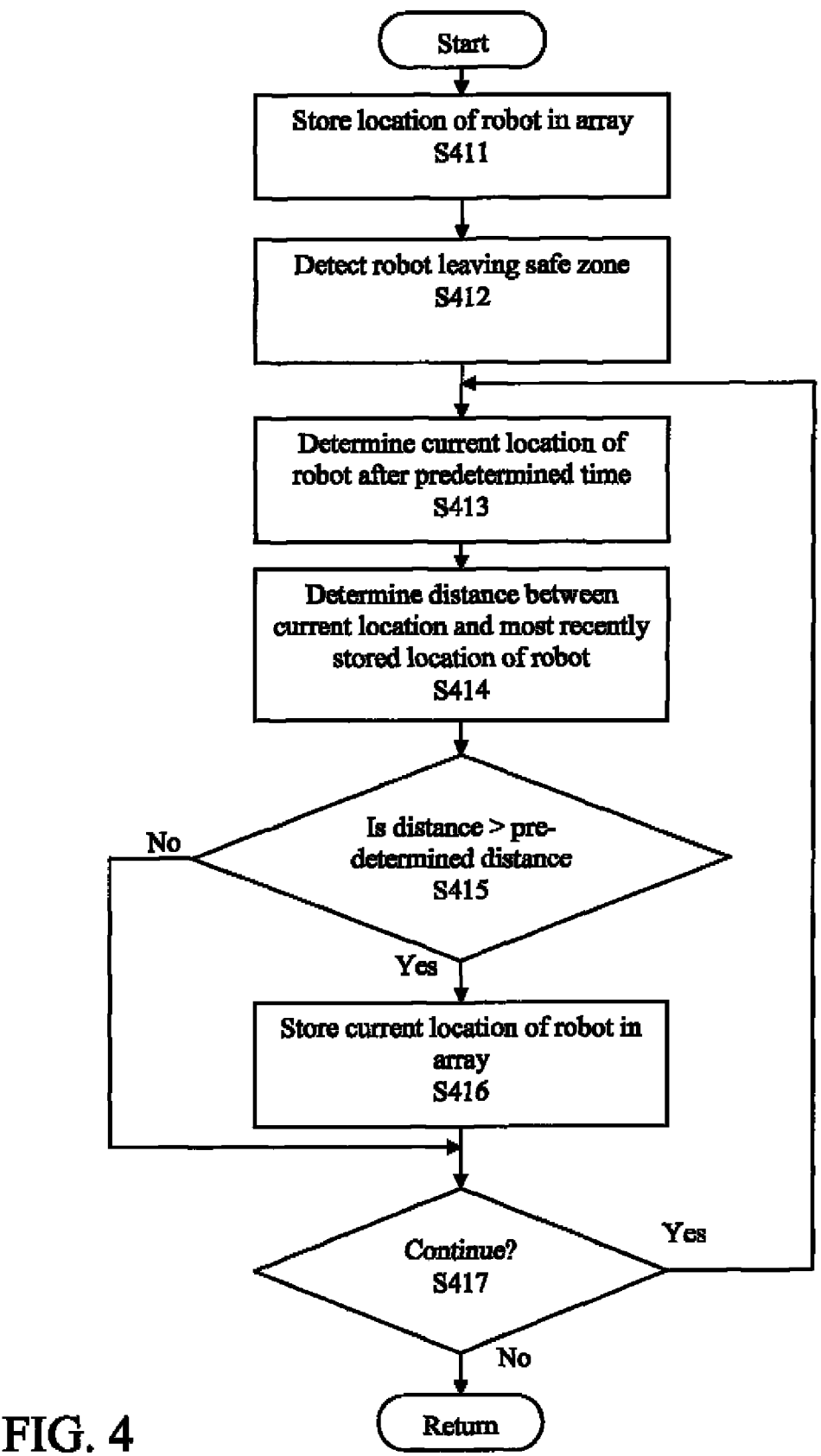
FIG. 4 is a flow diagram illustrating a process for storing locations resulting from robot movement, according to a representative embodiment.

FIG. 4 is a flow diagram illustrating a process for storing locations resulting from robot movement, according to a representative embodiment.

Referring to FIG. 4, blocks S411 through S417 illustrate an example process for storing locations of the robot 200, e.g., during training movements, indicated by block S110 in FIG. 1, in order to capture the forward path of the robot 200. In various embodiments, the movements may be identified and stored in real-time or near real-time. In block S411, the initial location of the robot 200 is stored in a location array, which may be included in memory 1140, for example, discussed below with reference to FIG. 11. The stored locations of the robot 200 may include Cartesian coordinates (e.g., XYZ coordinates) identifying the position the robot in three dimensions. For example, the location array may include the position of particular components of the extendable arm 210, such as the wrist 218 and/or the gripper 216, representative of the position of the extendable arm within the tool space. In an embodiment, the location array also stores the relative positioning of the movable joints of the robot 200, such as the movable stage 208, the elbow 217 and the wrist 218. For purpose of explanation, it is assumed that the initial location is within the safe zone 250, although the forward path of the robot 200 may begin anywhere within the tool space.

In block S412, the robot 200 is detected leaving the safe zone 250. After a predetermined period of time (e.g., about 100 msec.), the current location of the robot 200 is again detected in block S413. The time period may change based on a number of variables, such as the speed with which the robot 200 is moving through the tool space, where shorter time periods correspond to faster movements to assure sufficient forward path data stored in the location array. In block S414, the current location determined in block S413 is compared to the most recently stored location to determine the distance between the two locations, and thus the distance traveled by the robot 200 during the time period. For example, the first location determined in block S413 is compared to the initial location stored in block S411. In an embodiment, any time the robot 250 re-enters the safe zone 250, the location array is reset.

The distance determined in block S414 is compared to a predetermined minimum distance in block S415. When the distance between the two locations exceeds the minimum distance (block S415: Yes), the current location is stored in the location array in block S416 at the next point in the forward path. When the distance between the two locations does not exceed the minimum distance (block S415: No), the current location is not stored in the location array. This prevents an excessive number of locations from being stored in the location array, since every small and/or slow movement of the robot 200 is not recorded if the net difference in locations does not exceed the minimum distance. Accordingly, less storage may be used in the location array in recording the forward path of the robot 200, and fewer calculations may be performed in determining the return path of the robot 200, e.g., discussed below with reference to FIGS. 5-9.

In block S417, it is determined whether movement of the robot 200 is to continue. For example, the determination may be based on whether the robot 200 has reached a predetermined endpoint of the forward path. The forward path locations of the robot 200 will continue to be determined and stored as long as the robot 200 is moving along the forward path. When the movement of the robot 200 is to continue (block S417: Yes), the process returns to block S413, where the current location is again determined after the predetermined time period. In block S414, the current location is compared to the most recently stored location, which may now be the location stored in block S416, if the distance exceeds the minimum distance. When the movement of the robot 200 is not continuing (block 5417: No), storing locations resulting from movement of the robot 200 ends, and the process returns to await instruction for the robot 200 to return to the safe zone 250.

Thus, for example, robot firmware periodically runs a location task (e.g., every 100 msec.), which saves the current robot location to the location array, provided the current location is far enough from the last saved location, based on a configurable minimum distance. The saved location object may include all the joint angles and z-axis location, which can completely determine the position of the robot 200. The location array may be circular, for example, so that there is no danger of overflow if the robot 200 has been moved around for a long time. For example, the location array may be long enough to store the past 300 locations, which are assumed to be sufficient for the robot 200 to return to the safe zone 250.

Once the history of forward path locations has been stored, the robot 200 may retrace all or some of these exact locations back to the safe zone 250. However, exact retracing of every stored location, e.g., without additional supporting algorithms discussed below, is inefficient. For example, if the robot 200 is moved in the forward path by the user in the limp mode, simply retracing the return movements using every stored location would be time consuming and confusing. For instance, the user may teach several stations placed throughout the tool space at once, so retracing every stored location would require the robot 200 to go into and out of every station before returning to the safe zone 250. In addition, when the robot 200 collides with a station or other obstacle during the forward path movement (e.g., in the limp mode) and/or there is a substantial amount of "wiggle" (e.g., in the wrist 218 of the extendable arm 210) during the forward path movement, such collision and/or wiggle will be repeated by the retracing. Similarly, when a collision occurs when the robot 200 is moving under closed loop control (e.g., transfer or jogging operations), the retracing using all of the stored locations will repeat that collision. Therefore, according to various embodiments, heuristic algorithms are selectively applied to the stored robot movement locations to more efficiently determine a smoother return path, while still avoiding collisions, as discussed below.

Figure 5:
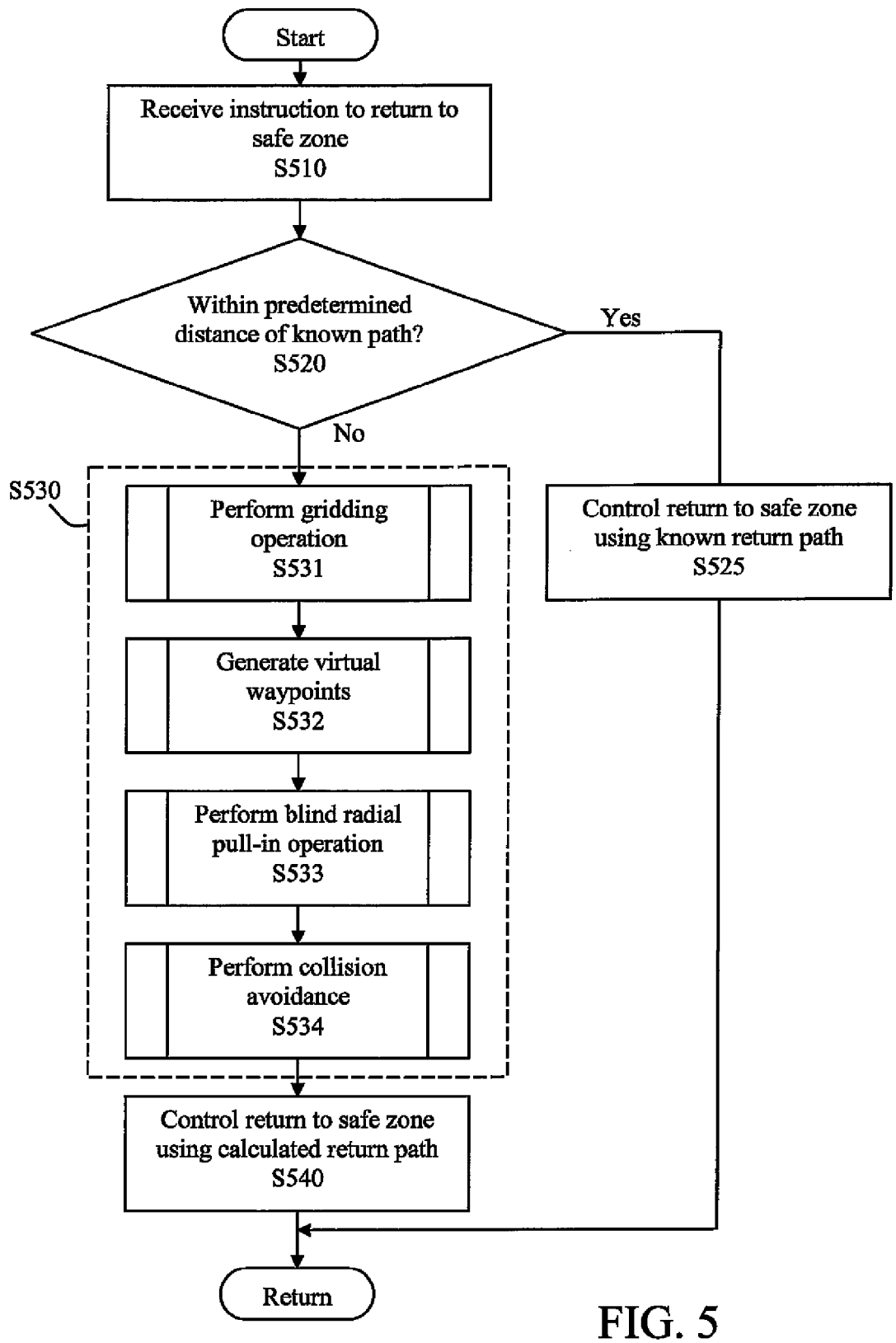
FIG. 5 is a flow diagram illustrating a process for applying heuristic algorithms to stored robot movement locations, according to a representative embodiment.

FIG. 5 is a flow diagram illustrating a process for applying heuristic algorithms to stored robot movement locations, according to a representative embodiment.

Referring to FIG. 5, blocks S510 through S540 illustrate an example process for applying heuristic algorithms to stored robot movement locations in order to calculate a new return path, indicated by block S120 in FIG. 1. As discussed above, the various embodiments use a history of saved locations of the robot 200, along with one or more heuristic algorithms to determine a smooth and efficient path back to the safe zone 250 from anywhere within the tool space. The heuristic algorithms make simplifying assumptions about the possible moves to determine the appropriate return path, as discussed below.

In block S510, the process begins when instructions are received for the robot 200 to return to the safe zone 250. In response, it is initially determined whether the robot 200 is presently located within a predetermined distance from a known (e.g., previously determined) return path back to the safe zone 250. For example, in an embodiment, the process checks whether the robot 200 is within about 10 mm of any return paths that have already been taught. The coordinates of the previously determined return paths may be stored in memory, for example, such as memory 1140 shown in FIG. 11. When the robot 200 is within the predetermined distance from a known return path (block S520: Yes), the robot 200 is controlled to use that known return path to return to the safe zone 250 in block S525, without the need for further heuristic algorithms being applied. When multiple known return paths are within the predetermined distance, one of the known return paths may selected based on various criteria, such as the return path closest to the current location (e.g., the teachpoint) of robot 200, the return path having the shortest physical distance or incorporating the fewest points to the safe zone 250, and the like.

When it is determined that the robot 200 is not within the predetermined distance from a known return path (block S520: No), the process proceeds to block S530, in which a new return path is calculated using one or more heuristic algorithms applied to the location data stored in the location array during movement of the robot 200 along the forward path, discussed above with reference to FIG. 4. In the depicted embodiment, block S530 includes four illustrative heuristic algorithms, all or a portion of which are executed to calculate the return path. In the depicted example, the processes for applying the heuristic algorithms include performing a gridding operation in block S531, generating waypoints in block S532, performing a blind radial pull-in operation in block S533, and performing collision avoidance block S534. In block S540, the return path determined by applying the heuristic algorithms of block 530 is used to control return of the robot 200 to the safe zone 250 without collisions with obstacles and/or stations.

It is understood that the four representative processes of block S530 are not limited to the order depicted in FIG. 5. Rather, the processes and/or various operations occurring within the processes may be performed in various alternative orders, and may be entirely or partially overlapping, depending on particular situations or application specific requirements, without departing from the scope of the present teachings. For ease of explanation, the processes of block S530 are discussed below in the order in which they appear in FIG. 5.

Figure 6:
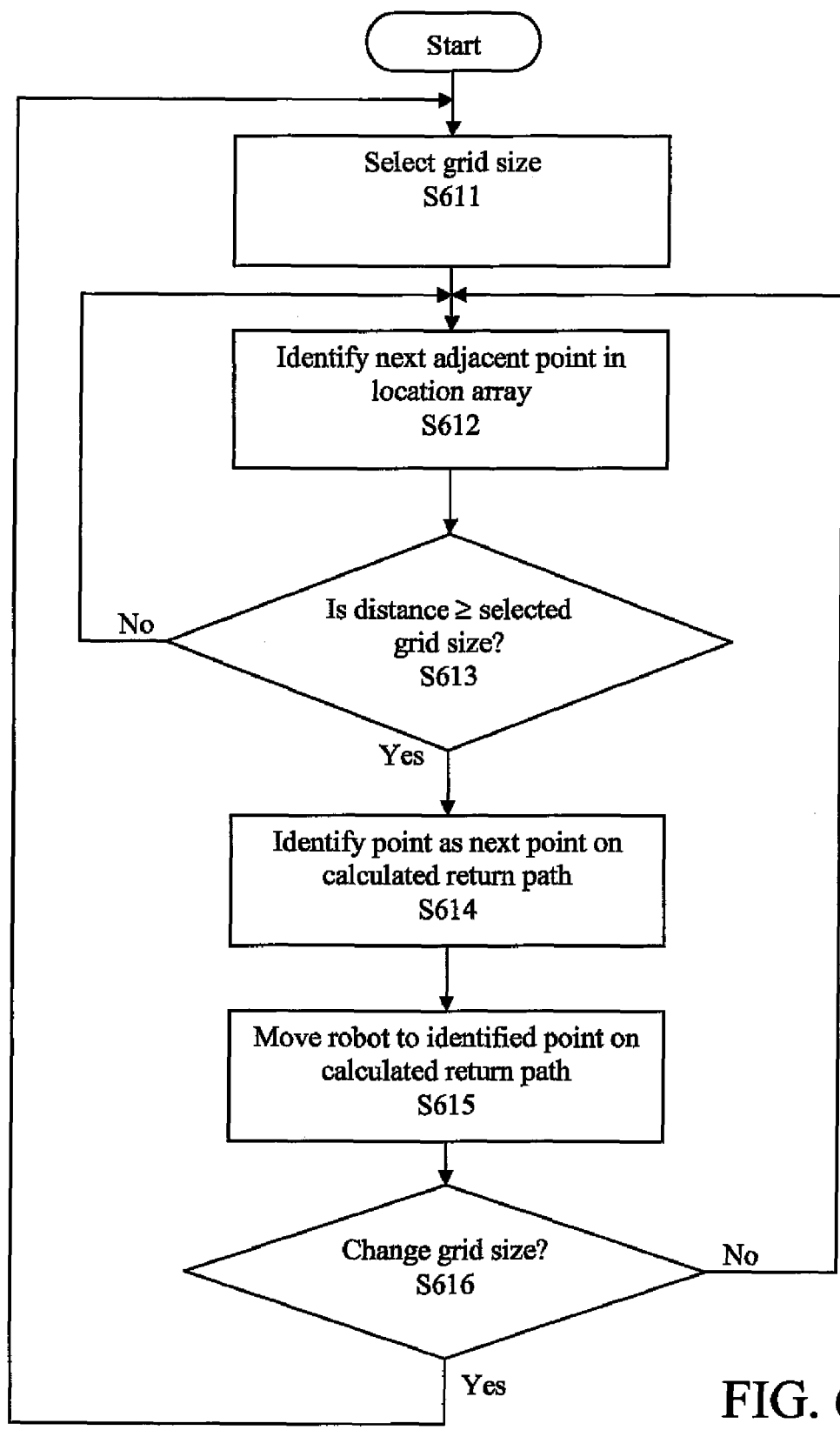
FIG. 6 is a flow diagram illustrating a process for performing a gridding operation using stored robot movement locations, according to a representative embodiment.

FIG. 6 is a flow diagram illustrating a process for performing a gridding operation using stored robot movement locations, according to a representative embodiment.

Referring to FIG. 6, a grid size is selected in block S611. The grid size indicates the distance between points on the forward path (stored in the location array) that will be used for calculating the return path. Generally, the larger the grid size, the smoother the return path since fewer points of the location array will be used, although the greater the risk of failing to account for an obstacle in the return path. Conversely, the smaller the grid size, the choppier the return path since more points of the location array will be used, although the risk of failing to account for an obstacle in the return path is less when more location array points are used. It is understood that the grid size may be selected at any time before or after execution of the gridding operation. For example, the initial grid size may be set before training the robot 200 to reach various teachpoints, or the grid size may be set automatically, e.g., based on the number of points of the corresponding forward path stored in the location array, the curve of the forward path, and the like. In an embodiment, the grid size starts from a predetermined value (e.g., about 10 mm), and then increased or decreased depending on the circumstances. In addition, as discussed below, the grid size may be changed during the gridding operation and/or as a result of performing collision avoidance shown in block S534 of FIG. 5.

In block S612, the next point adjacent to the current location is identified in the location array. Initially, the current location may be at the end of the forward path (i.e., the beginning of the retrace path) where the robot 200 is located. However, the robot 200 is not necessarily located at the end point or even at a teachpoint. The distance from the current location of the robot 200 and the next adjacent point is compared to the selected grid size in block S613 in order to decide whether to include the next adjacent point in the return path. When the distance to the next adjacent point is greater than or equal to the grid size (block S613: Yes), the next adjacent point in the location array is identified as the next point on the return path at block S614. When the distance to the next adjacent point is less than the grid size (block S613: No), the process returns to block S612 to identify the next adjacent point in the location array.

When the next adjacent point in the location array is identified as the next point on the return path at block S614, the robot 200 may then be moved to the identified next point of the return path in block S615. However, in various alternative embodiments, the robot 200 remains stationary until the return path has been calculated in its entirety (i.e., after all of the applicable heuristic algorithms indicated by block S530 of FIG. 5 have been applied), at which time the robot 200 is advanced along the return path to the safe zone 250 in one operation.

In block S616, it is determined whether the grid size should be changed. For example, when the return path does not substantially depart from the forward path, the grid size may be increased to reduce the number of calculations without significantly increasing the possibility of collision. Also, the grid size may be changed in response to the collision avoidance operations discussed below with reference to FIG. 9 (e.g., block S946). When it is determined that the grid size is to remain the same (block S616: Yes), the process returns to block S612 to identify the next point in the location array adjacent to the point most recently identified in block S614. When it is determined that the grid size is to change (block S616: Yes), the process returns to block S611 to select another grid size. In either case, blocks S612 through S616 are then repeated until the return path is complete or the gridding operation is no longer needed (e.g., once it is determined that a blind radial pull-in operation may be performed, as discussed below with reference to FIG. 8). To the extent the return path follows points along the forward path in reverse order, the return path is effectively a retrace path.

Generally, the grid size is used to make sure that the next location of the return path is at least a certain distance away from the current location. The grid size may change (e.g., in block S616) during execution of the return motion of the robot 200. For example, the grid size may be small at the beginning (e.g., a minimum of about 10 mm), and as the robot 200 moves further away from the starting position (e.g., the teachpoint), the grid size may increase (e.g., to a maximum of about 100 mm). As with spatial filtering, the greater the grid size, the smoother the return path with less wiggle, but also the greater the deviation from the actual forward path of the robot 200 and thus the greater the chances of a collision.

Figure 7:
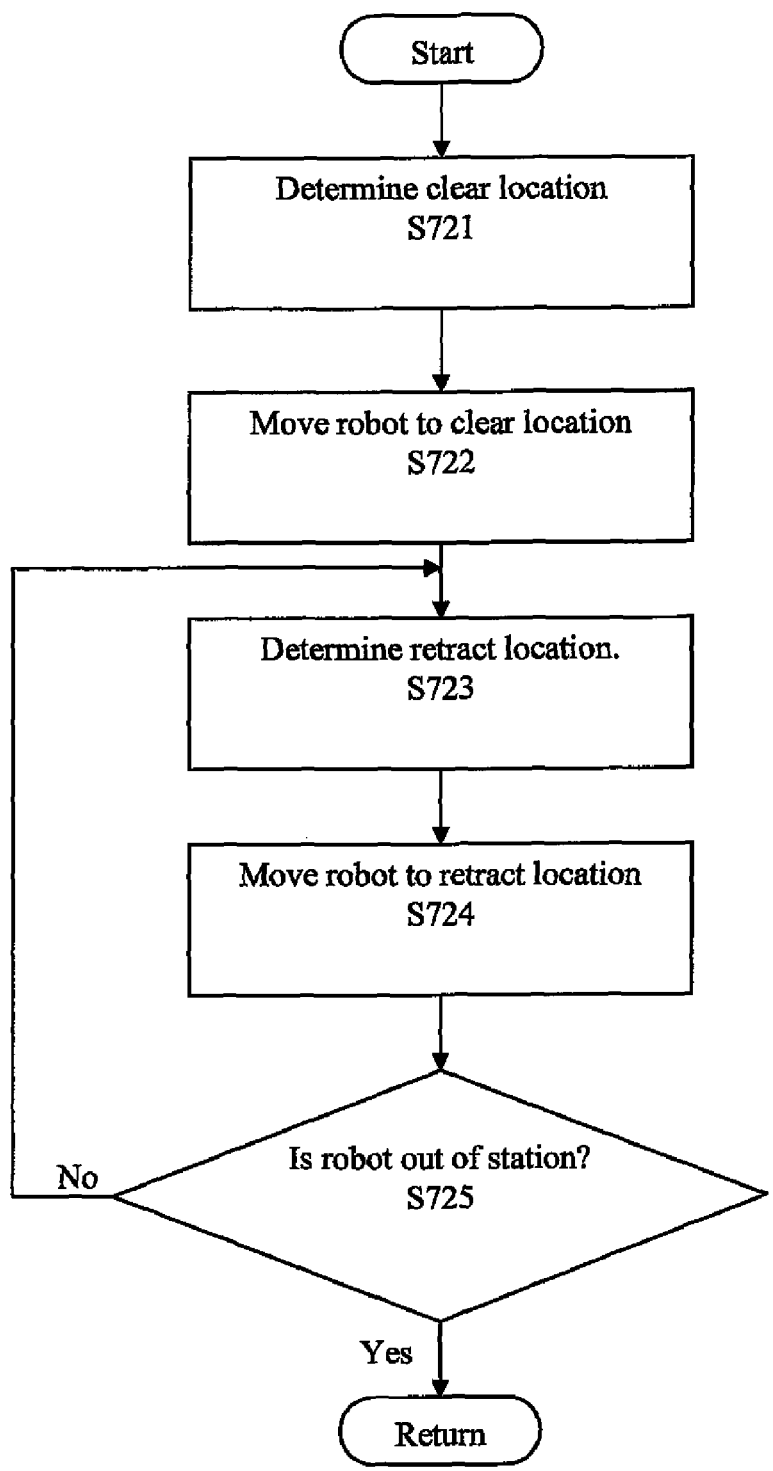
FIG. 7 is a flow diagram illustrating a process for generating waypoints using stored robot movement locations, according to a representative embodiment.

FIG. 7 is a flow diagram illustrating a process for generating waypoints using stored robot movement locations, according to a representative embodiment.

Generally, transfer moves of the robot 200 between the safe zone 250 and a teachpoint (e.g., a station) and back follow a particular pattern. That is, with respect to the forward path, the robot 200 moves from a location in the safe zone 250 to a retract location, from the retract location to a clear location, and from the clear location to the teachpoint location. The move from safe zone 250 to the retract location is a joint move (i.e., not necessarily a linear move), while the move from the retract location to the clear location and the move from the clear location to the teachpoint are straight-line Cartesian moves. For example, the move from the retract location to the clear location may occur in the XY plane and the move from the clear location to the teachpoint may occur in the Z (or vertical) dimension. The extendable arm 210 moves in a straight line to avoid collision with the sides of a station, for example, when a portion of the extendable arm 210, e.g., the gripper 216, enters the station, which is the last move is from clear location to the teachpoint location. With respect to the return path, the robot 200 moves from the teachpoint location to the clear location, from the clear location to the retract location, and from the retract location to the safe zone location.

For purposes of explanation, the retract location is a point in front of the station (or teachpoint) in the tool space where moves by the robot 200 to and from to the safe zone 250 will not collide with any obstacles/stations within the tool space. Also, the clear location is the location to and from which the robot 200 is able to move out of and into teachpoint (e.g., or other point of final destination inside a station) without colliding with the station. Movements inside the station typically are most likely to cause collision.

Referring to FIG. 7, a clear location is determined at block 5721 and the robot 200 is moved to the clear location at block 5722. A retract location is determined at block S723 and the robot 200 is moved to the retract location at block 5724. Of course, in various embodiments, the clear and retract locations may be determined substantially at the same time, before any movement of the robot 200 occurs, without departing from the scope of the present teachings. Also, in various embodiments, the movements of the robot 200 to the clear location and/or the retract location may be made in accordance with the gridding operation, described above with reference to FIG. 6. If the position of the robot 200 is not associated with an actual teachpoint, the clear and retract locations may be referred to as virtual clear and virtual retract locations.

The clear and retract locations are selected to match a typical move of the robot 200 from a teachpoint to the safe zone 250. Notably, the current location of the robot 200, where the return path begins, is considered to be the teachpoint, regardless of whether it corresponds to a station or other actual teachpoint. If the original forward path did not involve these movements, or if the current location is not a teachpoint, there is no harm in using these points along the return path as clear and retract locations. The transfer protocol may involve complex moves within a station (e.g., stair case move).

Typically, movement to a clear location is a straight up/down movement in the z-axis from the teachpoint, without changes in other joint angles (e.g., the waist 202, elbow 217 and wrist 218) of the robot 200. For example, when the gripper 216 of the robot 200 is holding a plate on a plate pad at a station, the robot 200 must first move upward to avoid colliding with tabs extending from sides of the plate-pad. According to various embodiments, the clear point is determined in block S721 by retracing the forward path locations (e.g., using the gridding operation) until the total distance from the teachpoint location in two dimensions (e.g., without the z-axis coordinates) reaches a predetermined distance. That position (including the z-axis coordinate) is used as the clear position. For example, the predetermined distance may be about 20 mm (in two dimensions) for a vertical move, which distance would compensate for the user manually pushing the wrist 218 of the robot 200 into the station, such as a plate pad, in limp mode without being perfectly vertical. Otherwise, the move along the z-axis may be underestimated.

With respect to block S723, the retract location may be a location along a retrace path, for example, from the clear location that is a predetermined distance (e.g., about 300 mm) from the clear location. In an embodiment, the robot 200 makes several short moves (e.g., determined by the grid size, as discussed above) until robot 200 reaches the retract location. Typically, the retract distance for a station is in the range of about 25 mm to about 100 mm from the corresponding teachpoint location. Therefore, when a retract location greater than the typical range (e.g., about 300 mm, as stated above) is used in blocks S723 and S724, according to various embodiments, it is very likely that the robot 200 is outside of any station when located at the retract location, if the robot 200 was inside a station when positioned at the teachpoint location to begin with.

However, according to various embodiments, another check is performed at block S725 to assure that the robot 200 has completely exited the station in which it may have been located. When it is determined that the robot 200 is not out of the station (block S725: No), the process returns to block S723 and a revised retract location is determined that is a greater distance along the retrace path from the clear location, and blocks S724 through S725 are repeated. When it is determined that the robot 200 is out of the station (block S725: Yes), the process returns to block S530 of FIG. 5 for application of one or more additional heuristic algorithms, including determining whether to perform a blind radial pull-in to the safe zone 250, as discussed below with reference to FIG. 8.

Referring again to block S725, the determination of whether the robot 200 is out of the station may be performed by various means, without departing from the scope of the disclosure. For example, the determination may include identifying whether the wrist 218 of the robot 200 is retracting backwards linearly when the robot 200 reaches the retract location in block S724. Retracting backwards means that the wrist 218 is moving linearly (or substantially linearly), where the motion occurs in a straight-line with respect to a point in the middle of the two fingers of the gripper 216 and a center point of the joint of the wrist 218. The motion will be in a direction headed away from the teachpoint. When the wrist 218 is retracting backwards linearly, it is likely that robot 200 is still pulling out of the station. Therefore, when the robot's wrist 218 is retracting backwards linearly, the process returns to block 5723 to determine another retract location, as discussed above. When the robot's wrist 218 is not retracting backwards linearly, then the process returns to block S530 of FIG. 5.

Figure 8:
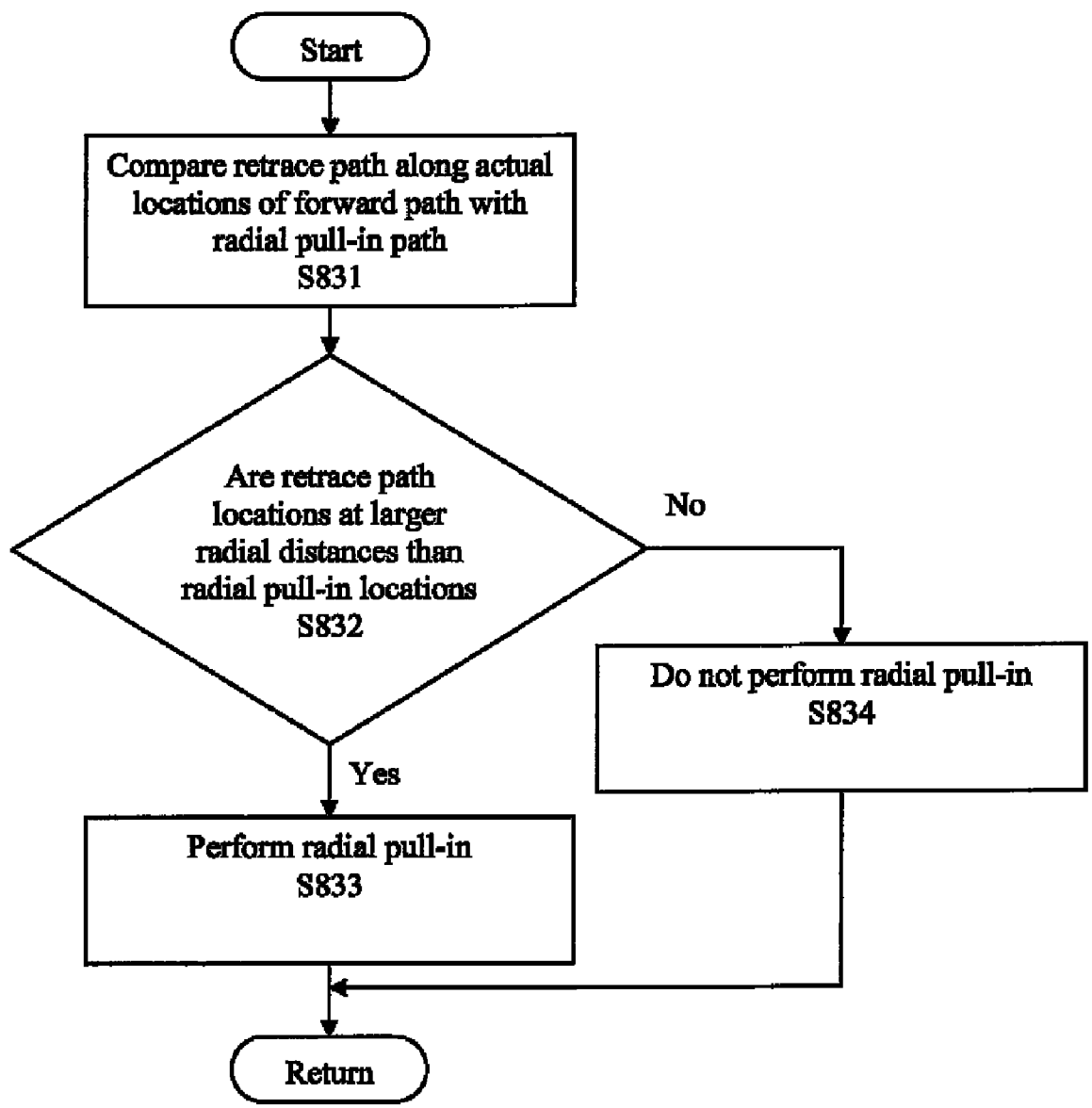
FIG. 8 is a flow diagram illustrating a process for performing a blind radial pull-in operation, according to a representative embodiment.

FIG. 8 is a flow diagram illustrating a process for performing a blind radial pull-in operation, according to a representative embodiment.

Once the retract location has been reached, it is assumed that the robot 200 has disentangled itself from any station in which it may have been located. Now, it is determined whether it is safe to blindly radially pull-in the extendable arm 210 from the retract location to the safe zone 250. Performing the blind radial pull-in increases efficiency of the retrace algorithm, for example, by avoiding repetition of extraneous movements made in the forward path, e.g., resulting from the user moving the robot 200 in the limp mode several times around the waist 218, or from the user moving the robot 200 to other stations, or the like. The radial pull-in is considered "blind" because the robot 200 departs from the known points of the forward path stored in the location array, and proceeds radially to the safe zone 250.

According to various embodiments, when the robot 200 pulls in the extendable arm 210 radially, the wrist 218 folds in, which by itself is a departure from the original forward path. It is possible that folding in the wrist 218 (and to a lesser extent the elbow 217) could cause collision with a nearby station or obstacle, which would otherwise have been avoided.

Therefore, referring to FIG. 8, the projected return path, which may include a retrace portion along the actual locations of the forward path, over a predetermined distance is compared with the projected radial pull-in path of the robot 200 from its present position (e.g., at the retract location) in block S831. For example, every actual location of the retrace path along the predetermined distance may be compared to points along the radial pull-in path. In an embodiment, the predetermined distance over which the comparisons occur is set to equal the length of the wrist 218 (e.g., about 200 mm), to compensate for movement of the wrist 218. It is then determined in block S832 whether the retrace path locations are at larger radial distances from the safe zone 250 than the radial pull-in path locations. When the retrace path locations are at larger radial distances (block S832: Yes), then it is safe to perform a blind radial pull-in of the extendable arm 210, as indicated in block S833. When the retrace path locations are not at larger radial distances (block S832: No), then a blind radial pull-in of the extendable arm 210 is not performed, as indicated in block S834, and the return path of the robot 200 continues along the retrace path, e.g., as discussed above with reference to FIG. 6. That is, if the retrace path (or portions of the retrace path) is pulling in faster than the blind radial pull-in path, it may be assumed that this movement was performed to avoid an obstacle. Therefore, the return path of the robot 200 continues to substantially coincide with the retrace path.

Of course, according to various embodiments, when the blind radial pull-in of the extendable arm 210 is not performed in block 5834, the process for performing a blind radial pull-in operation attempted again from a subsequently determined point on the return path.

Figure 9:
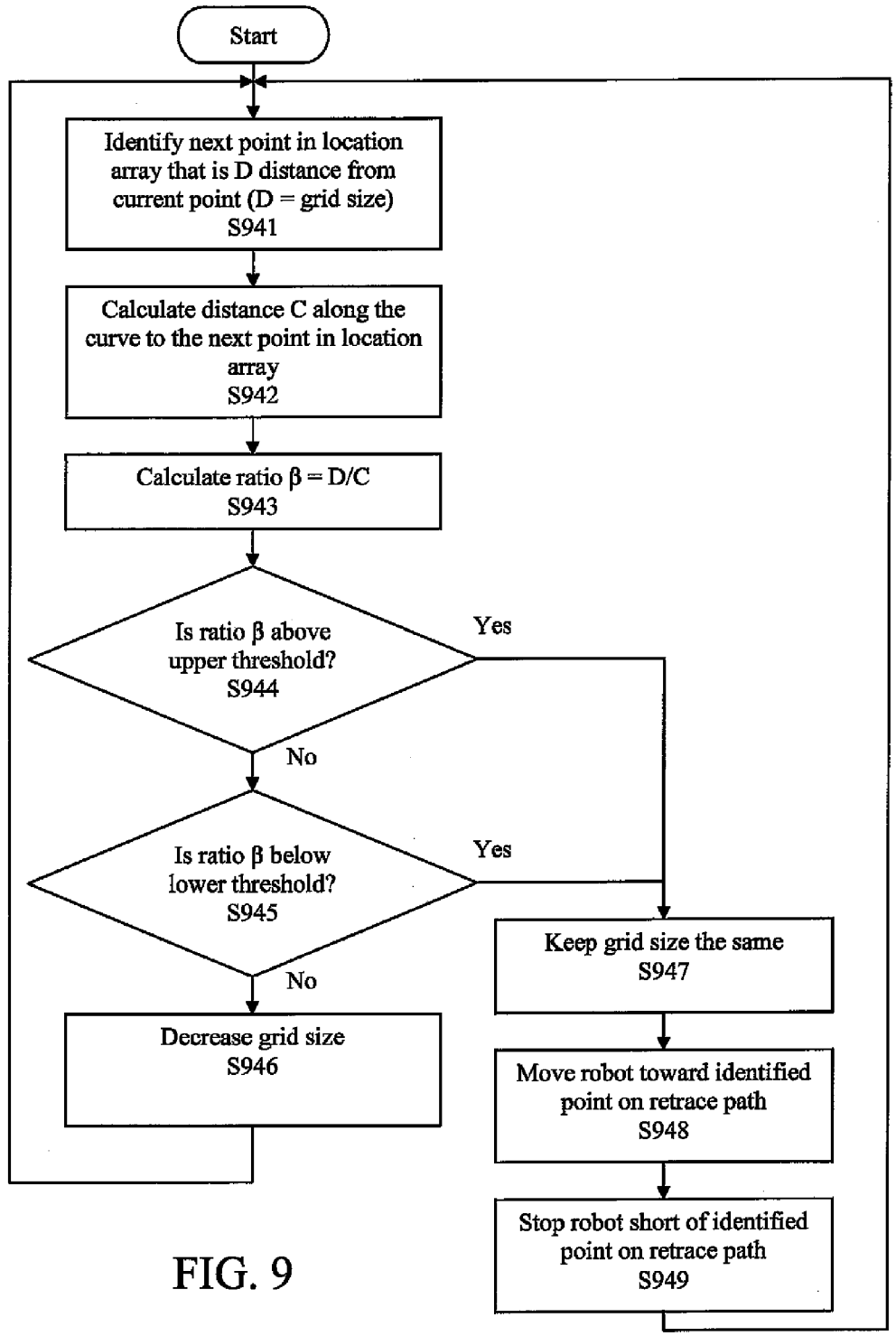
FIG. 9 is a flow diagram illustrating processes for performing collision avoidance, according to a representative embodiment.

Meanwhile, collision avoidance operations are performed throughout the process of calculating the return path and/or moving the robot 200. FIG. 9 is a flow diagram illustrating processes for performing collision avoidance, according to a representative embodiment.

More particularly, FIG. 9 depicts two representative processes for collision avoidance. The first process includes determining and adjusting grid size (blocks S941-S947) and the second process includes stopping movements of the robot 200 of the return path short of actual retrace path points (blocks S948-S949). The first and second collision avoidance processes may be used all or part of the time during calculation of the return path, and reduce the chances of collision in one or more of the other processes, discussed above.

Also as discussed above, the larger the grid size, the greater the deviation of the robot 200 from the original forward path, which increases the possibility of a collision that was not present in the original forward path. Accordingly, grid size may be decreased selectively in situations where it appears the chances of collision have increased. For example, one purpose of performing the gridding operation is to reduce wiggle while following the return path, where wiggle is extraneous or excess movement of the robot 200. However, what appears to be extraneous movement or excessive curving in the forward path may actually be purposeful moves to avoid a collision, as opposed to wiggle.

Referring to FIG. 9, a wiggle estimator may be implemented according to the first collision avoidance process to adjust grid size, as needed, based on the anticipated next segment of movement along the return path. In block S941, the next point of the retrace path in the location array is identified a straight-line distance of D from the current point of the return path, where D is the current grid size, as discussed above with reference to block S611 of FIG. 6. In block S942, a distance C is calculated along the actual curve (of the retrace path) to the next point in the location array. A ratio β is then calculated as D/C in block S943.

The ratio β is then compared to various thresholds to determine whether the current grid size should be maintained or reduced in order to lessen chances of a collision. In particular, it is determined in block S944 whether the ratio β exceeds an upper threshold (where the ratio β has a value is close to 1, indicating small amount of wiggle). When the ratio β exceeds the upper threshold (block S944: Yes), the grid size is kept the same in block S947. When the ratio β does not exceed the upper threshold (block S944: No), it is determined in block S945 whether the ratio β is below a lower threshold (where the ratio β has a value is close to 0, indicating a large amount of wiggle). When the ratio β is below the lower threshold (block S945: Yes), the grid size is kept the same in block S947. This is because the larger grid size is needed to eliminate apparently excessive wiggle.

When the ratio β is not below the lower threshold (block S945: No), it indicates that the amount of wiggle is moderate. In other words, the anticipated retrace path has a mild to moderate curve, which indicates that movement of the robot 200 in the corresponding portion of the forward path may have been made to avoid an obstacle or station. Therefore, it is determined in block S946 that the grid size should be decreased. For example, the grid size may be decreased to a specific value (e.g., to about 5 mm) or by a predetermined amount or percentage (e.g., by about 50 percent). Since it is known that the curve is relatively smooth, as indicated by the moderate amount of wiggle, it is unlikely that reducing the gird size will significantly increase the amount of undesirable wiggle in the return path. The process then returns to block S941 to continue the collision avoidance operations using the lower grid size.

Meanwhile, when it is determined that the grid size is to remain the same at block S947, the robot 200 is moved toward the identified point along the return path in block S948. However, in accordance with the second collision avoidance process, the return path of the robot 200 is a straight line movement, which stops short of the identified point on the retrace path by a specific distance in block S949. For example, the robot 200 may be stopped about 2 mm-4 mm short of the identified point along the retrace path, thus avoiding collisions or scraping that may have occurred during movement of the robot 200 along the corresponding portion of the forward path.

Figure 10:
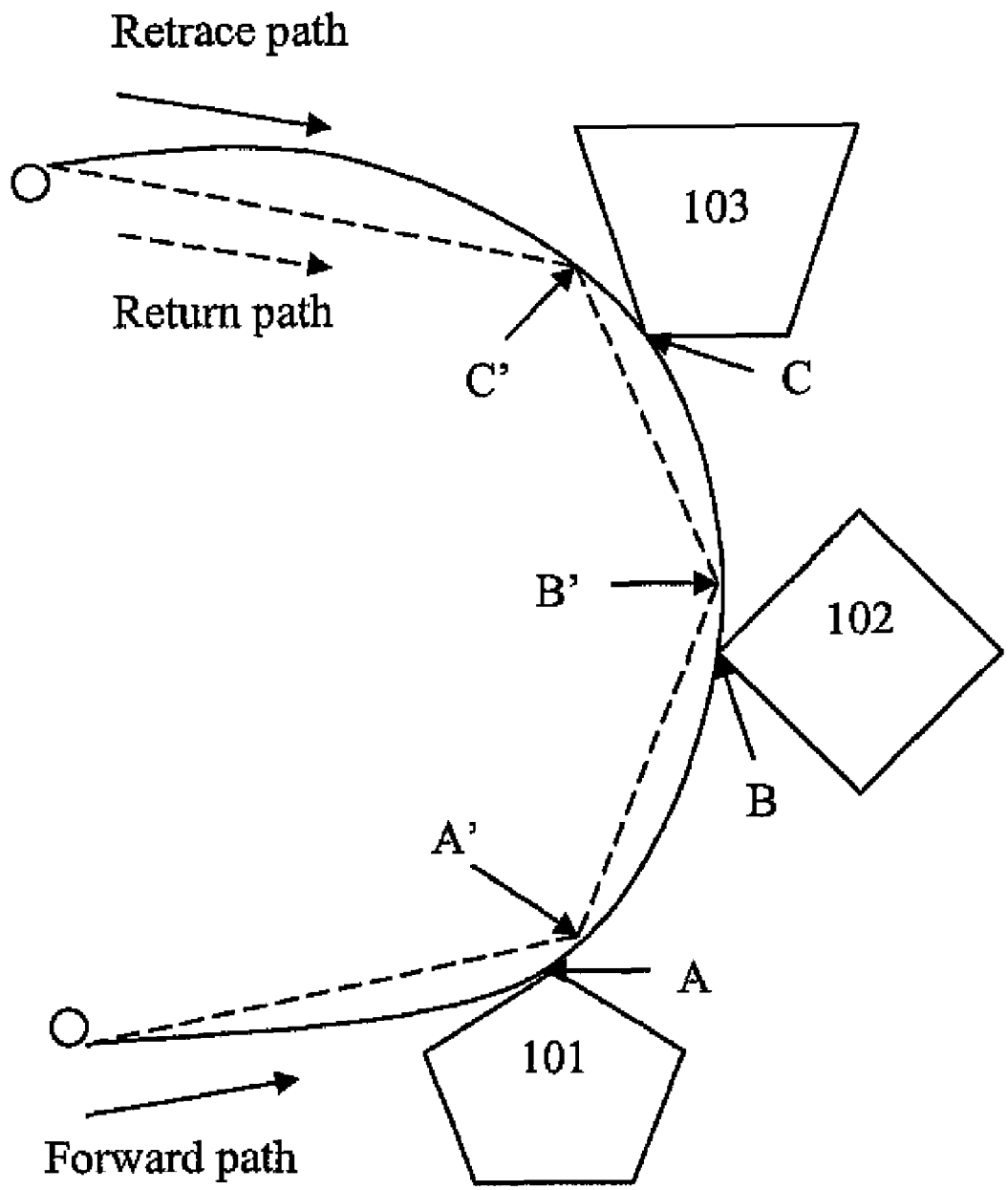
FIG. 10 is a block diagram showing collision avoidance movement through a tool space, according to a representative embodiment.

FIG. 10 is a block diagram showing collision avoidance movement through a tool space, according to a representative embodiment.

In particular, the forward path and the retrace path (solid line in opposite directions) of the robot 200 result in three scrapes with representative obstacles 101, 102 and 103 at points A, B and C, respectively. However, the return path (dashed line), determined in accordance with the second collision avoidance process discussed above with reference to FIG. 9, stops at points C', B' and A', which are a few millimeters short of the respective forward path points C, B and A. Thus, the collisions with the obstacles 101, 102 and 103 are avoided.

In various embodiments, different numbers, types and combinations of heuristic algorithms may be applied to the stored robot movement locations of the forward path in order to avoid collisions when moving the robot 200 to the safe zone 250, without departing from the scope of the present teachings. For example, when the robot 200 is moving in a closed loop, some of the heuristic algorithms (e.g., gridding and/or selecting clear and retract locations) may be skipped. This enables a complex path to be retraced (e.g., stair-case motions and the like), which otherwise does not lend itself well to the assumptions of the clear and retract locations, for example. Also, for example, a simple spatial filter may be applied to the joint angles (e.g., the waist 202, elbow 217 and wrist 218) of the robot 200, and the z-axis position in order to reduce wiggle. The spatial filter may be applied first, for example, as soon as the instruction is received to return to the safe zone (e.g., at block S510), prior to beginning of any motion. The greater the amount of filtering, the smoother the path with less wiggle, but the greater the deviation from the actual forward path of the robot 200. The various heuristic algorithms may be included to provide unique benefits for any particular situation or to meet application specific design requirements of various implementations, as would be apparent to one skilled in the art.

FIG. 11 is a block diagram of a robotic system, according to a representative embodiment, for implementing the processes for controlling a robot to avoid collisions, discussed above.

Referring to FIG. 11, the robotic system 1100 includes robot 1105, control logic or controller 1106 and memory 1140. According to various embodiments, the robot 1105 may include a single type of robot, or multiple and various types of robots, including representative robot 200, shown in FIG. 2, for example. As discussed above with reference to robot 200 in FIG. 2, the robot 1105 may include various elements, such as an extendable arm with movable members, such as an upper arm, a forearm, a wrist and a gripper. The robot 1105 may further include motors, such as direct drive motors, which drive the various elements, such as a waist and an elbow, for example.

According to an embodiment, the controller 1106 includes logic to control the robot 1105, and may include circuitry, firmware, software and/or combinations thereof, disposed in a single controller or in a combination of controllers and circuits. Although an architecture including the controller 1106 is depicted n FIG. 11, other robot control architectures may be provided in accordance with various other embodiments. As shown, the controller 1106 includes a control processor 1107, which provides control for various elements of robot 1105, such as motion in the z-axis, the waist, the elbow and the wrist. Such controls of the robot 1105 may in turn take place through respective motor controllers, such as representative motor controllers 1108, 1109, 1110 and 1111 for controlling the z-axis, waist, elbow and wrist motions, respectively. The motor controllers 1108, 1109, 1110 and 1111 are in turn coupled to respective motors 1112, 1113, 1114 and 1115, for moving elements of the robot 1105 in the z direction, and moving the waist, elbow and wrist, respectively.

In addition, the elements of the robot 1105 may be controlled in response to various sensors or encoders that determine motion and/or position by providing movement and position feedback to the corresponding motor controller. System logic, such as the controller 1106, may then use such sensors or encoders to control the motion and/or position of the corresponding element of the robot. For example, as shown in FIG. 11, encoders 1116, 1117, 1118 and 1119 are provided for vertical motion, and waist, elbow and wrist movement, respectively. Logic that controls motion in the z-axis may additionally include direct control of a brake 1120, which provides braking when the motor 1108 controlling z-axis movement is not engaged, for example.

The memory 1140 may include nonvolatile read only memory (ROM) and volatile random access memory (RAM), although it is understood that memory 1140 may be implemented as any number, type and combination of ROM and RAM, and may provide a location array for storing positions of the robot 1105, at least during movement of the robot 1105 through forward paths, as discussed above with reference to robot 200, and other functionality. In various embodiments, the memory 1140 may include a disk drive or flash memory, for example. Further, the memory 1140 may store program instructions and results of calculations or summaries performed by the control processor 1107, including program instructions for storing locations of forward paths and executing various heuristic algorithms for calculating return paths, as discussed above with reference to FIGS. 4-10.

The control processor 1107 is configured to execute one or more software algorithms, including the return path calculation processes of the embodiments described herein, in conjunction with the memory 1140. In various embodiments, the control processor 1107 may also execute software algorithms to control the basic functionality of the robotic system 1100. The control processor 1107 may include its own memory (e.g., nonvolatile memory) for storing executable software code that allows it to perform the various functions. Alternatively, the executable code may be stored in designated memory locations within memory 1140.

In an embodiment, a user and/or other computers may interact with the robotic system 1100 using input device(s) 1134 through I/O interface 1132. The input device(s) 1134 may include any type of input device, for example, a keyboard, a track ball, a mouse, a touch pad, touch-sensitive display, levers, buttons and the like. Also, information may be displayed on display 1133 through display interface 1131, which may include any type of graphical user interface (GUI), for example. The display interface 1131 and/or the I/O interface 1132 may be coupled directly to controller 1106 of the robot 1105, e.g., through control processor 1107.

According to various embodiments, additional movement and control aspects of the robot 1105 are provided, for example, by gripper motor controller 1123, which is coupled to corresponding motor 1124 and encoder 1125. The gripper motor controller 1123, gripper motor 1124 and gripper encoder 1125 provide for controller movement of a robot gripper, for example. The gripper motor controller 1125 may be coupled to the control processor 1107 of robot controller 1106.

Aspects of the systems and methods described herein are implemented as functionality or algorithms that may be programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include microcontrollers with memory, embedded microprocessors, firmware, software, etc. Furthermore, aspects of the systems and methods is embodied in microprocessors having software-based circuit emulation, discrete logic (sequential and combinatorial), custom devices, fuzzy (neural network) logic, quantum devices, and hybrids of any of the above device types.

It should be noted that the various algorithms, functions or processes disclosed herein are described as data and/or instructions embodied in various computer-readable media, in terms of their behavioral, register transfer, logic component, transistor, layout geometries, and/or other characteristics. Computer-readable media in which such formatted data and/or instructions is embodied include, but are not limited to, non-volatile storage media (e.g., memory 1140) in various forms (e.g., optical, magnetic or semiconductor storage media). Formatted data and/or instructions relating to control and operation of the robot 1105 and/or communication with the controller 1106 may be transferred by carrier waves, including transfers (uploads, downloads, email, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the systems and methods is processed by a processing entity (e.g., one or more processors) within the computer system in conjunction with execution of one or more other computer programs.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. A method of automatically controlling an extendable robot arm using a control processor to avoid collisions while returning to a first position from a second position, the method comprising:
   periodically storing locations of the robot arm as the robot arm moves along a forward path from the first position to the second position, wherein periodically storing locations of the robot arm as the robot arm moves along the forward path, comprises:
     determining a current location of the robot arm on the forward path after a predetermined time period;
     determining a distance between the current location and a previously stored location of the robot arm on the forward path; and
     storing the current location as a point on the forward path when the determined distance is greater than a predetermined minimum distance;
   applying a plurality of heuristic algorithms to the stored locations to determine a return path to the first position, the return path including at least a portion of a retrace path retracing the stored locations of the forward path; and returning the robot arm to the first position under control of the control processor using the determined return path.

2. The method of claim 1, further comprising:
determining whether the robot arm at the second position is within a predetermined distance of a known return path before applying the plurality of heuristic algorithms,
wherein the robot arm is controlled to return to the first position using the known return path when the known return path is within the predetermined distance.

3. The method of claim 1, wherein applying the plurality of heuristic algorithms includes performing a gridding operation, comprising:
selecting a grid size;
determining a distance between a current point of the return path and a next stored point of the stored locations of the retrace path; and
identifying the next stored point as the next point of the return path when the determined distance is greater than or equal to the grid size.

4. The method of claim 3, wherein applying the plurality of heuristic algorithms further includes:
adjusting the grid size based on comparing the next point on the return path with a corresponding portion of the retrace path.

5. The method of claim 4, wherein adjusting the grid size comprises:
calculating a ratio between the determined distance and a curve length of the retrace path between the current point of the return path and the next stored point of the stored locations; and
adjusting the grid size based on the calculated ratio.

6. The method of claim 5, wherein adjusting the grid size based on the calculated ratio comprises:
increasing the grid size when the ratio is less than an upper threshold and greater than a lower threshold; and
maintaining the grid size when the ratio is greater than the upper threshold or less than the lower threshold.

7. The method of claim 3, wherein applying the plurality of heuristic algorithms includes decreasing the grid size to reduce chances of collision.

8. The method of claim 3, wherein applying the plurality of heuristic algorithms further includes:
identifying a collision avoidance point of the return path short of the next point of the retrace path,
wherein the robot arm is controlled to move to the collision avoidance point of the return path to reduce chances of collision.

9. The method of claim 1, wherein applying the plurality of heuristic algorithms includes generating waypoints, comprising:
determining a clear location;
determining a retract location; and
determining whether the robot arm is clear of a station that includes the second position at the retract location.

10. The method of claim 9, wherein determining whether the robot arm is clear of the station comprises:
determining whether a wrist of robot arm is retracting backwards linearly when the robot arm is positioned at the retract location; and
when wrist of the robot arm is retracting backwards linearly, determining that the robot arm is not clear of the station.

11. The method of claim 10, wherein generating waypoints further comprises:
determining another retract location when the robot arm is not clear of the station.

12. The method of claim 9, wherein applying the plurality of heuristic algorithms further includes performing a blind radial pull-in operation, comprising:
determining whether a collision will likely occur during a blind radial pull-in of the robot arm along a radial pull-in path from the retract location to the first position; and
wherein, when a collision is not likely to occur, the blind radial pull-in of the robot arm is performed.

13. The method of claim 12, wherein determining whether a collision will likely occur during the blind radial pull-in of the robot arm comprises:
determining whether locations on the retrace path are larger radial distances from the first position than locations on the radial pull-in path; and
performing the blind radial pull-in of the robot arm when the radial distances of the locations on the retrace path are larger than the radial distances of the location of the radial pull-in path.

14. The method of claim 13, wherein determining whether a collision will likely occur during the blind radial pull-in of the robot arm further comprises:
determining another retract location when the radial distances of the locations on the retrace path are less than the radial distances of the location of the radial pull-in path.

15. A method of automatically determining a return path of a robot using a control processor to avoid collisions while returning to a safe zone from an extended position outside of the safe zone, the method comprising:
determining a distance between a current point on the return path, corresponding to a current position of the robot, and a next point on a retrace path previously stored in a location array during movement of the robot along a corresponding forward path from the safe zone;
identifying the next retrace path point as a potential next point on the return path when the determined distance is greater than or equal to a grid size;
calculating a ratio between the determined distance and a curve length of the retrace path between the current point on the return path and the potential next point on the retrace path;
determining whether to reduce the grid size based on the calculated ratio; and
when it is determined not to reduce the grid size, identifying the potential next point as an actual next point on the return path, and moving the robot toward the safe zone on the return path, including the current point and the actual next point, under control of the control processor.

16. The method of claim 15, further comprising:
determining whether a collision will likely occur during a blind radial pull-in of the robot from the actual next point on the return path to the safe zone along a radial pull-in path; and
when it is determined that a collision is not likely to occur, performing the blind radial pull-in of the robot along the radial pull-in path under control of the control processor.

17. The method of claim 16, further comprising:
when it is determined that a collision is likely to occur, determining another actual next point on the return path.

18. The method of claim 16, wherein determining whether a collision will likely occur during a blind radial pull-in of the robot comprises:
determining whether locations on the retrace path are larger radial distances from the safe zone than locations on the radial pull-in path; and performing the blind radial pull-in of the robot when the radial distances of the locations on the retrace path are larger than the radial distances of the location of the radial pull-in path.

19. A computer readable medium storing a program, executable by a computer, for controlling an extendable robot arm to avoid collisions while returning to a safe zone from an extended position, the computer readable medium comprising:

a return path determining code segment for determining at least a portion of a return path of the robot arm from the extended position to the safe zone based on previously stored locations of the robot arm as the robot arm moved along a forward path from the safe zone to the extended position;

a waypoint determining code segment for determining a clear location and a retract location on the return path with respect to the extended position;

a clearance code segment for determining whether the robot arm is clear of a station that includes the extended position at the retract location; and a radial pull-in code segment for determining whether a collision will likely occur during a blind radial pull-in of the robot arm along a radial pull-in path from the retract location to the safe zone, when the clearance code segment determines that the robot arm is clear of the station, wherein the blind radial pull-in of the robot arm along the radial pull-in path is performed when the radial pull-in code segment determines that a collision is not likely to occur, and wherein the robot arm moves to another previously stored location on the forward path when the radial pull-in code segment determines that a collision is likely to occur.

* * * * *